United States Patent
Burfin et al.

[11] Patent Number: 5,812,624
[45] Date of Patent: Sep. 22, 1998

[54] CORE OF A PRESSURIZED WATER NUCLEAR REACTOR AND TOP NOZZLE OF A FUEL ASSEMBLY OF THE CORE

[75] Inventors: Pascal Burfin, Saint Genis les Ollieres; Georges Masuy, Lyons, both of France

[73] Assignees: Framatome, Courbevoie; Cogema, Villacoublay, both of France

[21] Appl. No.: 536,249

[22] Filed: Sep. 29, 1995

[30] Foreign Application Priority Data

Sep. 30, 1994 [FR] France ................... 94 11754

[51] Int. Cl.⁶ ............... G21C 19/06; G21C 3/12
[52] U.S. Cl. ........................ 376/364; 346/446
[58] Field of Search ................ 376/362, 364, 376/446, 353, 434

[56] References Cited

U.S. PATENT DOCUMENTS

| | | | |
|---|---|---|---|
| 3,769,158 | 10/1973 | Winders | 376/446 |
| 4,127,445 | 11/1978 | Anthony, I | 376/448 |
| 4,192,716 | 3/1980 | Anthony, II . | |
| 4,278,501 | 7/1981 | Steinke | 376/446 |
| 4,572,817 | 2/1986 | Silverblatt | 376/434 |
| 4,620,960 | 11/1986 | Wilson, I et al. | 376/446 |
| 4,670,213 | 6/1987 | Wilson, II et al. | 376/446 |
| 4,692,304 | 9/1987 | Gjertsen | 376/446 |
| 4,938,919 | 7/1990 | Rylatt | 376/446 |
| 4,986,960 | 1/1991 | Larson, I | 376/446 |
| 5,057,272 | 10/1991 | DeMario et al. | 376/446 |
| 5,213,757 | 5/1993 | Ohman . | |
| 5,452,334 | 9/1995 | Reparaz et al. | 376/446 |

FOREIGN PATENT DOCUMENTS

| | | | |
|---|---|---|---|
| 0 146 806 | 7/1985 | European Pat. Off. . | |
| 0 543 253 | 5/1993 | European Pat. Off. . | |
| 3011893 | 1/1988 | Japan | 376/353 |
| 2105095 | 3/1983 | United Kingdom | 376/364 |

*Primary Examiner*—Harvey E. Behrend
*Attorney, Agent, or Firm*—Pollock, Vande Sande & Priddy

[57] ABSTRACT

Each of the square top nozzles (26) of the fuel assemblies of the core includes four locating openings (40) in the vicinity of the vertices of the nozzle. The set of locating pins (35) of the upper core plate (32) includes four pins at each of the positions of fuel assemblies which are intended to be engaged in the four openings (40) of the top nozzle (26). The locating openings (40) of the nozzle may consist of the internal bores of sleeves (36) which are fixed on the nozzle in an axial arrangement and holds the spring leaves (38) of the nozzle. The locating openings may also be machined inside four bosses, projecting at the upper part of the assembly, and each arranged in one corner of the assembly.

4 Claims, 6 Drawing Sheets

CORE OF A PRESSURIZED WATER NUCLEAR REACTOR AND TOP NOZZLE OF A FUEL ASSEMBLY OF THE CORE

FIELD OF THE INVENTION

The invention relates to the core of a pressurized water nuclear reactor and to a top nozzle of a fuel assembly of the core.

BACKGROUND OF THE INVENTION

Pressurized water nuclear reactors include a core, consisting of prismatic fuel assemblies which are in juxtaposed positions inside the reactor vessel which is filled, during operation of the reactor, by pressurized water constituting the reactor coolant.

Each of the fuel assemblies of the core consists of a bundle of long fuel rods arranged parallel to each other and held in a framework formed by guide tubes, spacers and two top nozzles. The guide tubes are arranged in the longitudinal direction of the assembly and are connected to transverse spacers which are spaced apart regularly over the length of the assembly and which hold the rods in a regular lattice in the transverse sections of the assembly.

The guide tubes are also connected at each of their ends to one of the two nozzles which constitute parts for stiffening and closing the assembly. The guide tubes are longer than the fuel rods and include, at each of their ends, a part which projects from the bundle and on which one of the two end nozzles of the assembly is fixed.

The nozzles of the assembly have a polygonal shape, and generally a square shape, and include an adaptor plate pierced by openings allowing passage of reactor cooling water through the nozzle.

The bottom nozzle of a fuel assembly includes four support feet which are connected to the adaptor plate via an enclosure wall having a square transverse section.

In the service position inside the vessel of the nuclear reactor, the fuel assembly rests on a core support plate, forming part of the lower internals of the reactor, via the feet of its bottom nozzle. Locating pins of the fuel assemblies are fixed on the core support plate, so as to project from the upper face of the support plate on which the fuel assemblies rest. The support feet include openings which each engage on a locating pin, so as to position and hold the fuel assembly on the support plate. When they are being fitted in the vessel, the fuel assemblies rest on the core support plate so that their bottom nozzles are juxtaposed and held by the locating pins.

The top nozzles of the fuel assemblies include a square top plate connected by an enclosure wall to an adaptor plate. The square top plate includes two bosses at two corners of the top plate which lie on a diagonal.

The openings in the bosses of the top nozzle of an assembly serve for positioning the assembly in the core, and also for handling of the assembly, which is carried out by introducing the fingers of a gripper into the openings of the top nozzle of the assembly.

The upper parts of the assemblies of the core are positioned and held inside the vessel by an upper core plate which bears on the upper part of the assemblies, via springs mounted on the top nozzles of the fuel assemblies.

The upper core plate, which also constitutes the lower plate of the upper internals of the nuclear reactor which are arranged in the vessel above the core, includes a lower bearing face intended to bear on the springs of the fuel assemblies when fitting the upper internals in the vessel of the nuclear reactor.

The locating pins of the fuel assemblies are fixed on the upper core plate so as to project from the bearing face. When fitting the upper internals and the upper core plate, above the assemblies of the core, the locating pins engage in the openings of the bosses of the top frame of the top nozzles which lie in juxtaposed positions, when the core has been fuelled by depositing the fuel assemblies on the core support plate.

The number and the arrangement of the locating pins of the upper core plate are such that each of the fuel assemblies receives two locating pins which engage in openings of the top nozzle, which openings are arranged in the corners of the nozzle, and placed along a diagonal. The flanges for holding the spring leaves via which the upper core plate bears against the fuel assemblies are placed in the other two corners of the top nozzle.

Each of the fuel assemblies is therefore held in position only by two locating pins.

The locating pins fixed projecting from the bearing face of the upper core plate constitute the lower end part of the upper internals of the nuclear reactor.

During operations of maintenance and handling of the upper internals, some of the locating pins which project at the lower part of the upper internals may be damaged, for example by impact against a structure element of the nuclear reactor, in the case of a maneuvering error.

The locating pins may be bent under the effect of the impact, so that they are no longer in alignment with the openings of the top nozzles of fuel assemblies into which they are to be introduced.

These bent locating pins can therefore no longer ensure satisfactory positioning of the corresponding fuel assemblies, or can no longer be introduced into the locating openings of the top nozzles.

It is therefore necessary to repair the pins by straightening, this being an operation which may be difficult and sometimes even impossible to carry out if the pin exhibits excessive flexural deformation.

In some cases, it is therefore necessary to remove the part of the pin projecting at the bearing face of the upper core plate by cutting it flush with this bearing face.

In the case of cutting off the projecting part of a locating pin, the fuel assembly of the core, an opening of whose nozzle lies plumb with the cut locating pin after replacement of the upper internals and of the upper core plate, is then retained in the second opening of the top nozzle of the assembly by only one locating pin.

This may result in defective positioning and holding of the fuel assembly in the core.

Furthermore, some fuel assemblies may exhibit geometrical defects, especially after a relatively long period of use in the core of the nuclear reactor. In particular, some fuel assemblies may be bowed, so that it may be difficult to introduce these fuel assemblies into certain positions, inside the core, and in particular into the peripheral positions in which the fuel assembly comes into contact with a baffle assembly forming part of the lower internals of the reactor. In this case, fitting of the fuel assembly may require its orientation to be modified by rotation about its axis, so as to present it in a position that is more favorable in view of its deformation.

Because of the position, along a diagonal, of the locating openings of the top nozzle of a fuel assembly of square cross-section, it is necessary to rotate the fuel assembly through one half-turn in order to place it in a position such that the openings in the top nozzle are plumb with the locating pins of the upper core plate.

A half-turn rotation of the fuel assembly does not generally make it possible to solve the problem posed by the difficulties of positioning a bowed assembly.

SUMMARY OF THE INVENTION

The object of the invention is therefore to provide a core of a pressurized water nuclear reactor, consisting of prismatic fuel assemblies arranged with their axes vertical and each including a bottom nozzle resting on a core support plate and a top nozzle including at least two locating openings, the assemblies being arranged in such a way that their bottom nozzles, on the one hand, and their top nozzles, on the other hand, of polygonal shape, are placed in juxtaposed positions, and the core furthermore including an upper core plate, a bearing face of which is intended to rest on the top nozzles of the assemblies via springs and comprising a set of locating pins projecting from the bearing face and arranged so that they can each be engaged in a locating opening of a fuel assembly nozzle, this core being produced in such a way that the fuel assemblies are held in position efficiently even if one or more locating pins need to be cut along the bearing face of the upper core plate, and in such a way that the orientation of the fuel assemblies can be adjusted, when loading the core, so as to facilitate loading in the event of deformation to some fuel assemblies.

To this end, each of the polygonal top nozzles of the fuel assembly includes four locating openings in the vicinity of the vertices of the nozzle, and the set of locating pins of the upper core plate includes four pins, at each of the positions of fuel assemblies, intended to engage in the four openings of the top nozzle of a fuel assembly.

The invention also relates to a top nozzle of a fuel assembly of square cross-section, including four locating openings at each of the vertices of the nozzle.

BRIEF DESCRIPTION OF THE DRAWINGS

In order to explain the invention clearly, a description will now be given, by way of example, with reference to the appended drawings figures, of an embodiment of a nuclear reactor core and of a fuel assembly top nozzle, according to the invention.

DESCRIPTION OF PREFERRED EMBODIMENTS

Figure 1:
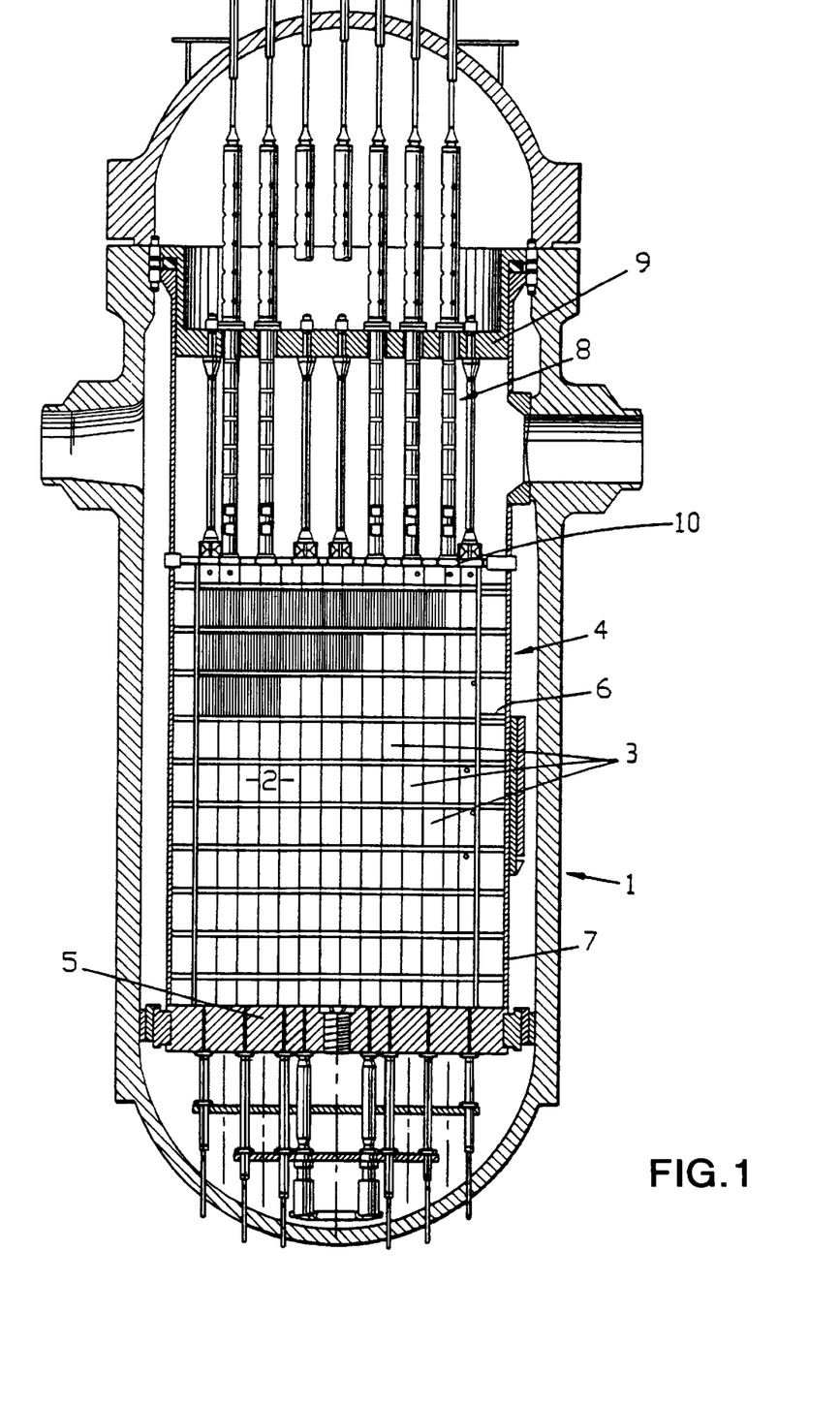
FIG. 1 is a view in vertical section of a pressurized water nuclear reactor vessel containing the reactor core.

FIG. 1 shows a pressurized water nuclear reactor vessel 1. The vessel 1 includes a barrel, of generally cylindrical shape, which is arranged with its axis vertical in its service position represented in FIG. 1.

Inside the vessel is arranged the nuclear reactor core 2 consisting of the fuel assemblies 3, of generally prismatic shape with square cross-section, arranged inside internals 4, called lower internals.

The lower internals include, in particular, a core support plate 5 which is fixed to the lower end of a shell 7 constituting the barrel of the core 2, and on which the assemblies 3 of the core 2 rest via their lower part.

A baffle assembly 6, including spacers and vertical plates for holding the peripheral assemblies of the core, is arranged inside the core barrel 7.

Projecting locating pins, on which locating openings of the bottom nozzles of the assemblies engage during loading of the core, are fixed on the upper face of the core support plate 5. The fuel assemblies are placed and held juxtaposed inside the baffle assembly 6.

The upper internals 8 of the reactor, which include an upper plate 9 forming a flange via which the upper internals 8 are suspended inside the vessel 1, and a lower plate 10 constituting the upper plate of the core 2, which holds and positions the upper parts of the fuel assemblies 3, are arranged above the core 2.

The upper plate 9 of the upper internals 8 is connected to the upper core plate via vertical core support columns.

The upper internals include guide tubes, parallel to the core support columns, which guide the absorber rods of the core 2 reactivity control rod clusters.

The guide tubes of the control rod clusters are arranged above some assemblies 3, distributed through the cross-section of the core 2, in which the absorber rods of the control rod clusters can be moved inside guide tubes of the fuel assembly 3.

When the lower internals are fitted in the vessel 1, the upper core plate 10 rests on the upper part of the fuel assemblies 3 which constitutes the top nozzle of these assemblies and which is fitted with leaf springs on which the core support plate 10 bears with some degree of pressure. The fuel assemblies 3 are thus held inside the core 2, in the axial direction of the vessel, while allowing a slight displacement of the assemblies under the effect of the forces exerted by the cooling water flowing through the vessel of the reactor and an expansion or a contraction of the structures of the fuel assemblies during transient conditions accompanying temperature variations of the core.

In addition, the core support plate 10 includes locating pins, on its lower face or bearing face, which are intended to be introduced into locating openings of the top nozzles of the fuel assemblies 3.

Figure 2:
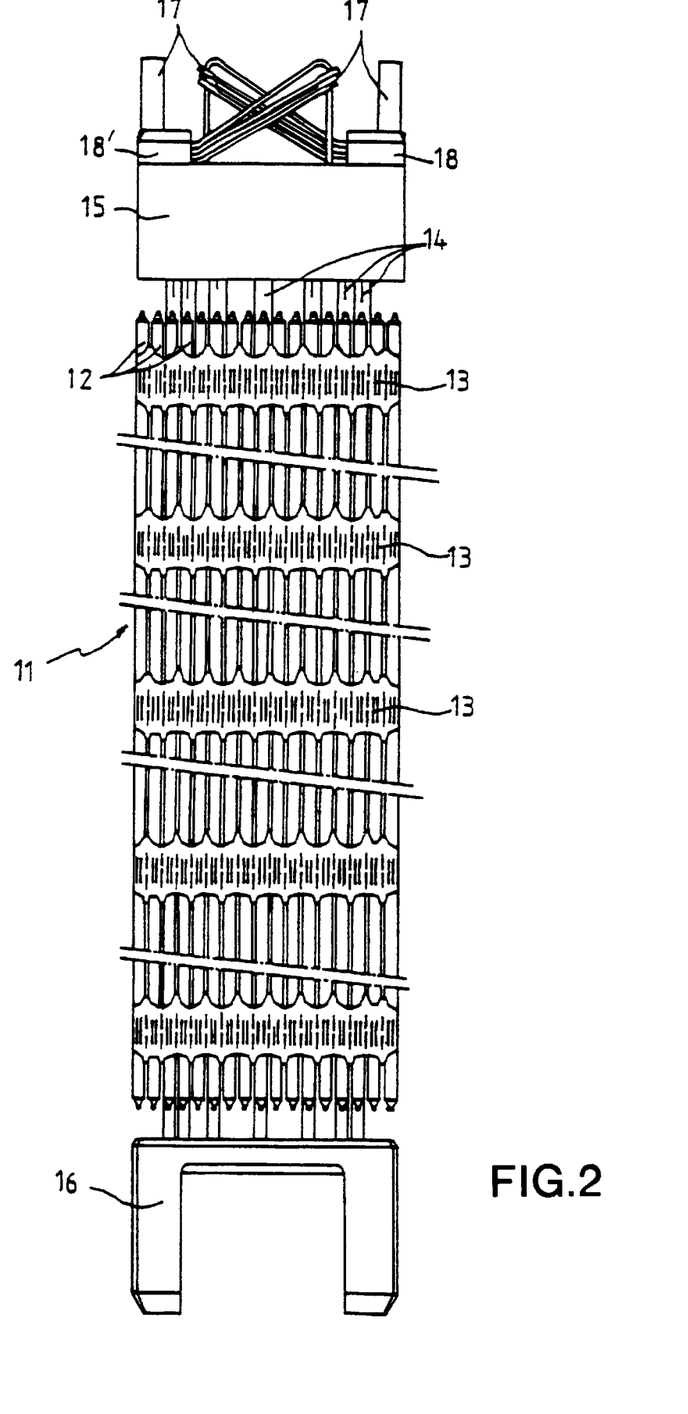
FIG. 2 is a view in side elevation of a fuel assembly of the pressurized water nuclear reactor core.

FIG. 2 shows a fuel assembly 11, which includes a set of rods 12 arranged parallel to each other to form a bundle, inside the framework of the assembly which itself consists of spacer grids 13, intended to hold the rods 12 transversely and distributed over the height of the assembly, and guide tubes 14, which pass through the set of grids 13, which are fixed on the grids 13 and which include at their ends parts that project from the bundle of rods 12 and on which the top nozzle 15 and the bottom nozzle 16 of the fuel assembly 11 are fixed.

The bottom nozzle includes a transversely oriented adaptor plate, on which are fixed the lower ends of the guide tubes 14 and the feet via which the fuel assembly 11 rests on the lower core plate 5 when the fuel assembly is being fitted in the core 2 of the nuclear reactor.

The upper part of the top nozzle 15 includes four bosses such as 18 and 18', two of these bosses, which lie diagonally on the square top nozzle 15, serving to fix the leaf springs 17 of the top nozzle 15, and the other two bosses including the locating openings intended to receive the locating pins of the upper core plate.

Figure 3:
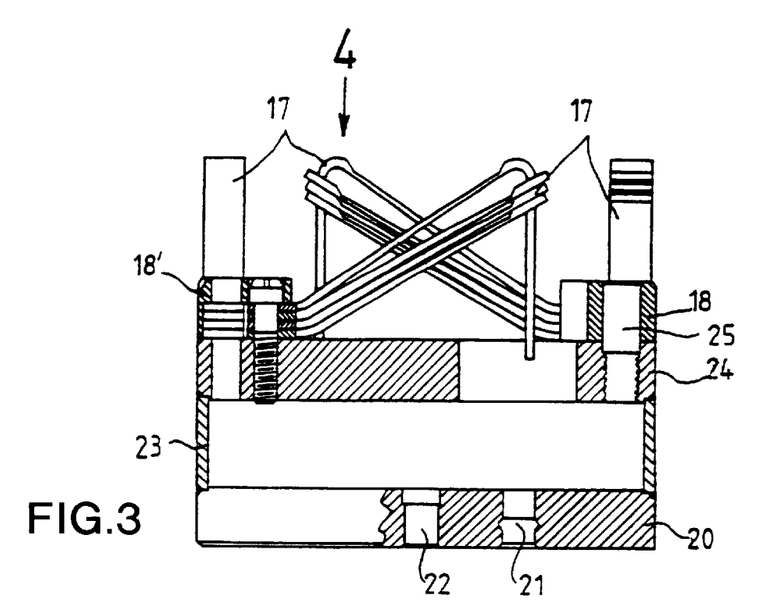
FIG. 3 is a view in elevation and in partial section, along line 3—3 of FIG. 4, of the top nozzle of a fuel assembly according to the prior art.
Figure 4:
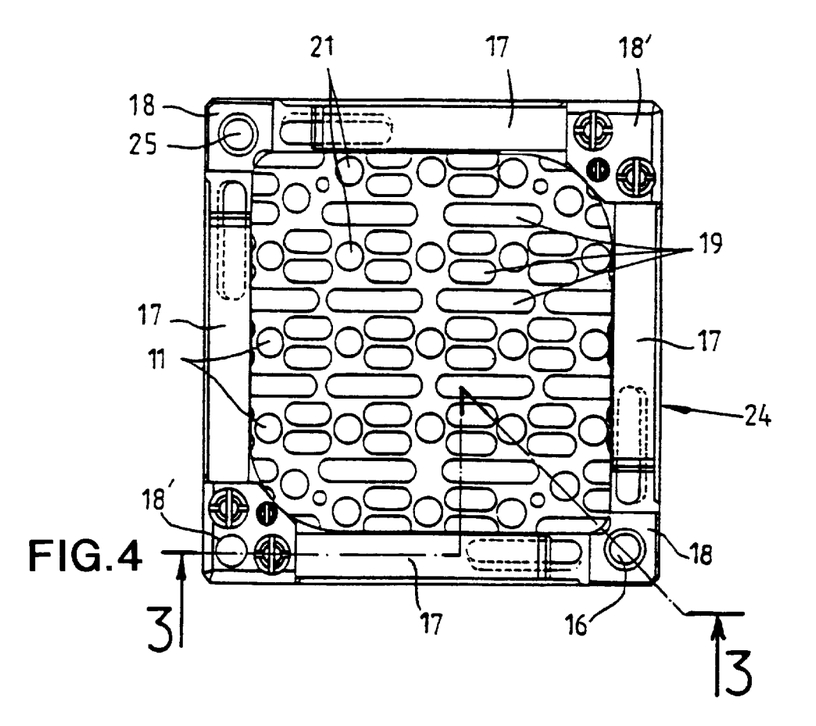
FIG. 4 is a plan view in the direction of arrow 4 of FIG. 3.

FIG. 3 shows the top nozzle 15 of the fuel assembly in a view in elevation and in partial section along line 3—3 of FIG. 4.

The top nozzle 15 includes an adaptor plate 20 through which generally oblong water passage openings 19 and circular openings 21 for fastening the end parts of the guide tubes 14 of the assembly pass. Above the adaptor plate 20, the top nozzle 15 includes a top plate 24 which is fixed by an enclosure wall 23 on the adaptor plate 20. The nozzle 15 is fabricated by welding, the parts 20, 23 and 24, which have a square transverse section corresponding to the transverse section of the assembly, being fixed together by welds in the vicinity of their peripheral edge.

The bosses 18 and 18' are made at the corners of the top plate 24.

The bosses 18' arranged at the ends of a first diagonal of the top plate 24 allow fastening of the leaf springs 17 of the nozzle, which include a part which is engaged in a slot inside the boss 18' and is fixed on the top plate 24 by screws.

The bosses 18 which are arranged at the ends of a second diagonal of the top plate 24 are each pierced by an opening 25 intended to receive a locating pin of the upper core plate, when fitting the upper internals in the vessel, above the assemblies 3 which have been loaded.

Because of this, the upper core plate includes, at each of the assembly positions, i.e., at each of the zones which bear on a top nozzle 15 of a fuel assembly 3, two locating pins having a part projecting from the lower bearing face of the upper core plate.

If one of the two locating pins suffers damage requiring it to be cut off, when replacing the upper core plate, the fuel assembly is then held by only one locating pin engaged in an opening 25 of its top nozzle 15.

This may result in insufficient holding of the fuel assembly in the core.

Furthermore, in order to fit the fuel assemblies in the core, it is not possible to modify the position of a fuel assembly by a 90° rotation, insofar as, after a 90° rotation, the locating openings 25 of the fuel assembly no longer lie in a position making it possible to receive the locating pins of the upper core plate.

The only possible rotational movements of the fuel assemblies inside the core are 180° movements.

Figure 5A:
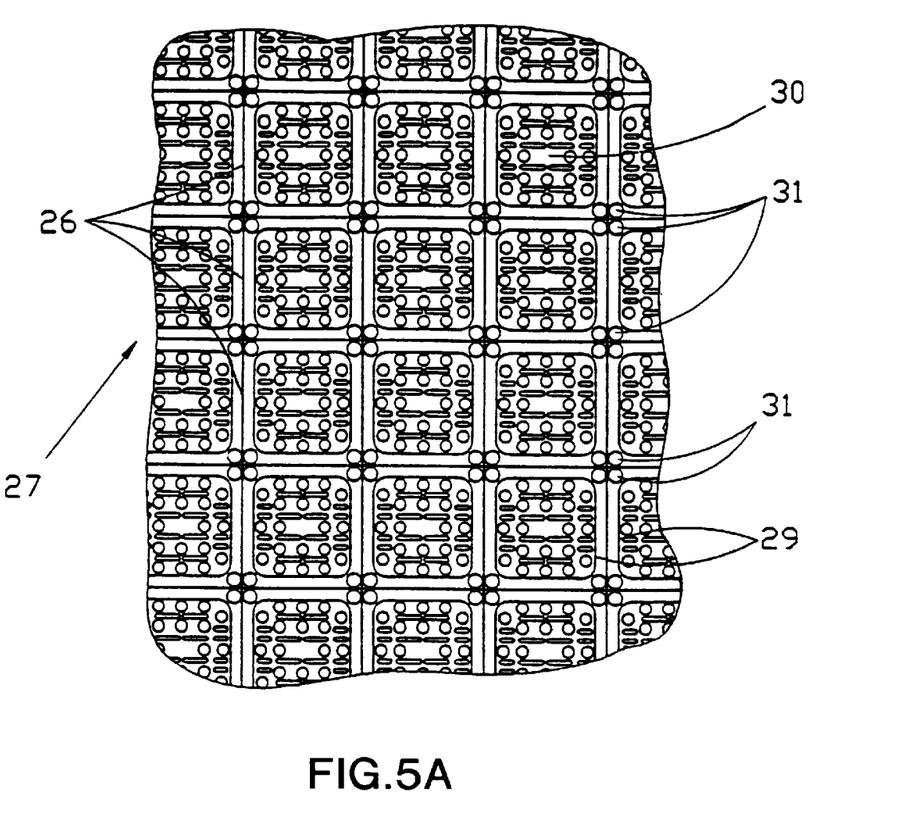
FIG. 5A is a schematic plan view of the upper part of a set of fuel assemblies which are arranged juxtaposed in the nuclear reactor core according to the invention.
Figure 5B:
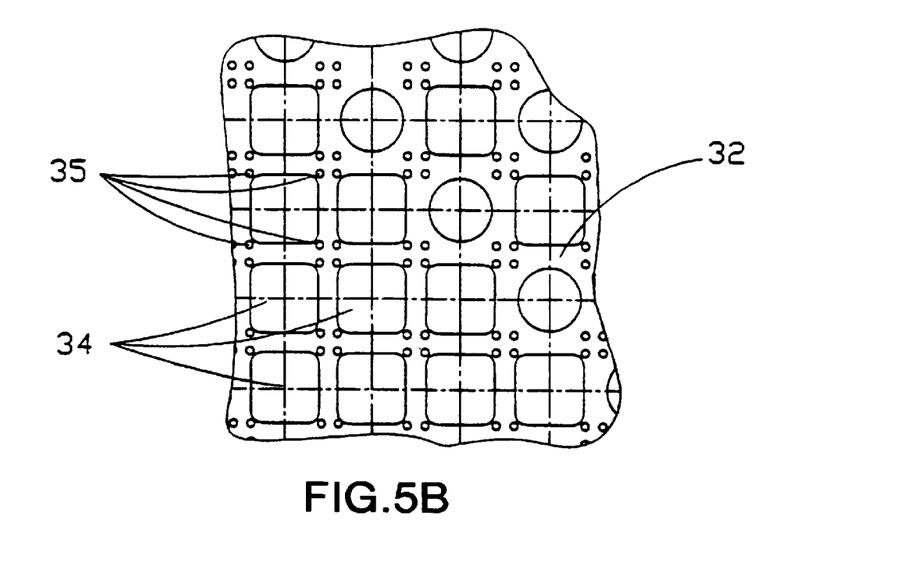
FIG. 5B is a partial view from below of the upper core plate of a nuclear reactor core according to the invention.

FIGS. 5A and 5B represent, in plan view, the upper part of the fuel assemblies of a nuclear reactor core according to the invention and, viewed from below, the upper core plate according to the invention, which is intended to rest on the upper part of the fuel assemblies of the core.

As shown in FIG. 5A, the top nozzles 26, of square cross-section, of the fuel assemblies 27 constituting the nuclear reactor core according to the invention, are juxtaposed and come into contact via their lateral sides to constitute a regular lattice with square units.

Each of the top nozzles 26 of the fuel assemblies 27 includes a top plate 28 having a central opening 29 allowing the passage of the nuclear reactor cooling water which passes through the adaptor plate 30, arranged below the top plate 28 and including water passage openings.

According to the invention, each of the nozzles 26 of the fuel assemblies 27 includes four circular locating openings 31 which are located in the vicinity of the corners of the square top plate 28.

As shown by FIG. 5B, the core support plate 32, through which water passage openings such as 33 or 34 pass at each of the positions of the fuel assemblies 27, includes four locating pins 35 arranged at the vertices of a square around each of the water passage openings 33 and 34.

The openings 34, having the shape of squares with rounded corners, are arranged at each of the positions of the fuel assemblies 27 which are not intended to receive a core reactivity control rod cluster.

In contrast, the circular openings 33 passing through the upper core plate 32 are arranged in positions of assembly 27 intended to receive a core reactivity control rod cluster.

The locating pins 35 projecting below the lower bearing face of the upper core plate 32 have an arrangement, in the plane of the plate 32, which is identical to the arrangement of the locating openings 31 of the juxtaposed nozzles 26 at the upper part of the core.

In this way, when the upper core plate 32 is brought to bear on the upper part of the fuel assemblies 27, each of the locating pins 35 of the upper core plate 32 can be introduced into a locating opening 31 of the top nozzle 26 of a fuel assembly 27, in such a way that each fuel assembly is fixed under the locating plate 32 by four locating pins 35.

Figure 6:
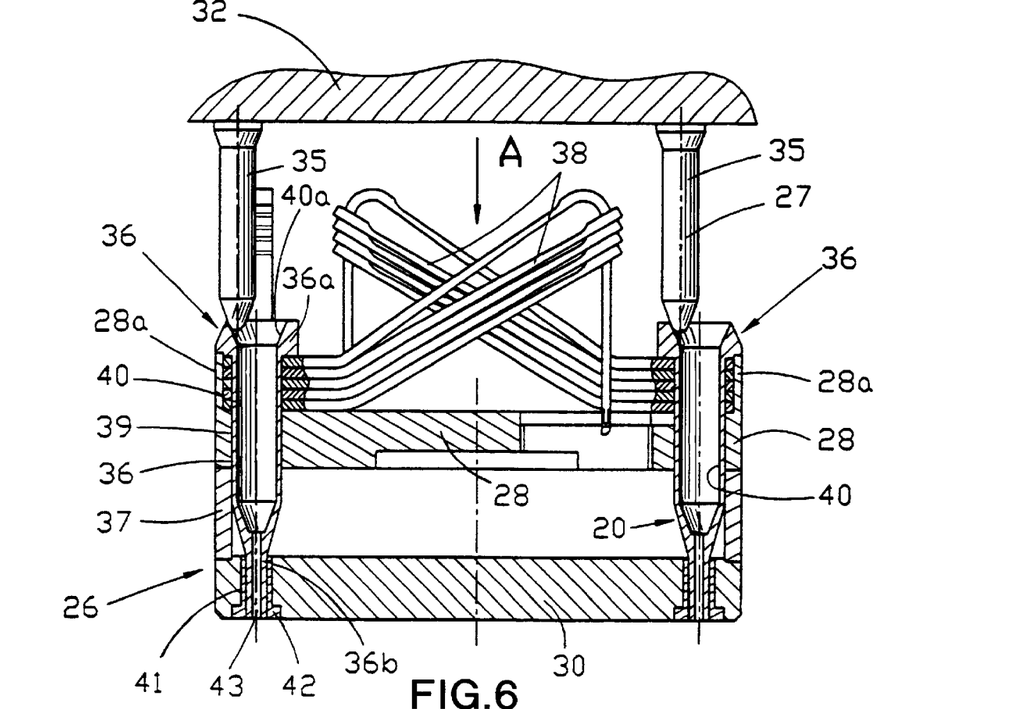
FIG. 6 is a view in section along line 6—6 of FIG. 6A of a fuel assembly top nozzle according to the invention and of a part of the upper core plate including the locating pins of the fuel assembly.
Figure 6A:
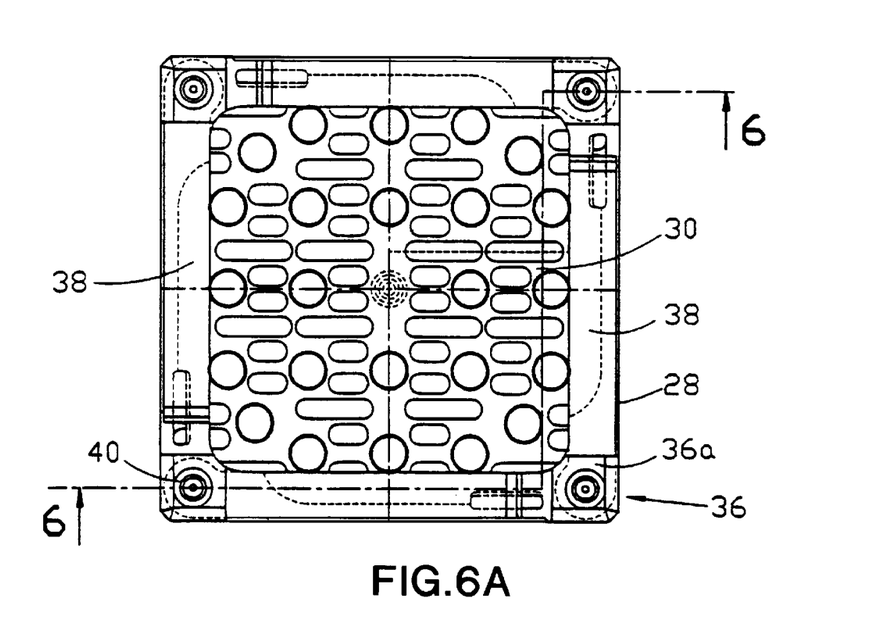
FIG. 6A is a plan view in the direction of arrow A of FIG. 6.

FIGS. 6 and 6A represent a top nozzle of an assembly of a nuclear reactor core according to a first embodiment of the invention and according to.

FIG. 6 is a view in vertical section along line 6—6 of FIG. 6A, which is a plan view along A of FIG. 6. The top nozzle 26 represented in FIGS. 6 and 6A includes, in conventional fashion, an adaptor plate 30 through which water passage openings and openings for fastening the guide tubes pass, and a top plate 28 fixed in a parallel arrangement above the adaptor plate 30, via an enclosure wall 37 which is welded along its upper edge and along its lower edge on the top plate 28 and on the adaptor plate 30, respectively.

As shown, in particular, in FIG. 6A, the top plate 28 as well as the adaptor plate 30 and the enclosure wall 37 have square transverse sections.

Leaf springs 38 are fixed along the sides of the top plate 28, by means of four sleeves 36 which are fixed in the four corners of the square top plate 38.

As shown in FIGS. 6 and 6A, the sleeves 36 include an upper part 36a, which is widened relative to the body of the sleeve 36, and a tubular body in which the sleeve bore 40, which includes a bevelled emergent part 40a widening towards the outside of the nozzle, is arranged.

The bore 40 in the sleeve 36 constitutes a locating opening of the nozzle 26, located in the vicinity of one of the corners of the nozzle and intended to receive a locating pin 35 projecting below the lower face of the upper core plate 32, when the upper internals of the reactor are being fitted above the fuel assemblies including nozzles such as the nozzle 26.

The lower end of the projecting part of the locating pin 35 has the shape of a bullet rounded at its end.

When engaging the locating pin 35 in the locating opening 40 of the top nozzle 26, the end part of the locating pin 35 cooperates with the entry bevel 40a of the opening 40 in order to introduce the locating pin into the opening 40 and to position the fuel assembly accurately.

The sleeve 36 includes a lower part 36b which has a diameter substantially less than the diameter of the main part of the sleeve 36, and which is separated therefrom by a frustoconical surface.

Aligned openings 39 and 41, intended respectively to receive the body and the lower part 36b of the sleeve 36, during fitting of the sleeve 36 on the top nozzle 26, pass through the top plate 28 and the adaptor plate 30.

The top plate 28 furthermore includes a peripheral lip 28a which projects at its corners in which the sleeves 36 are fixed.

When fitting the sleeves 36 on the top nozzle 26, the end parts of the spring leaves 38, stacked on one another and including superposed through-openings, are fixed on the nozzle 26 by means of the sleeves 36. The heads 36a of the sleeves 36 bear on the end parts of the spring leaves 38 and on the upwardly projecting lip 28a of the top plate 28. The bodies of the sleeves 36 are engaged in the through-openings of the spring leaves 38.

The lower part 36b of each of the sleeves 36, which is engaged in the opening 41 of the adaptor plate 30, is fixed on the adaptor plate by means of a bush 42 engaged in the opening 41 around the part 36b of the sleeve. The bush 42 includes a widened part which is introduced into a countersunk hole on the lower face of the adaptor plate 30.

After the sleeve 36 has been mounted, it is possible to fix the bush on the end 36b of the sleeve and on the adaptor plate, for example by a weld, so as to ensure rigid and robust fastening of the bush 36 on the adaptor plate of the nozzle.

The spring leaves 38 are fixed on the top plate 28 by engagement of the bodies of sleeves 36 in the aligned openings of the spring leaves and by clamping between the head 36a and the upper surface of the top plate 28.

The lower part 36b of the sleeves 36 includes a bore 43 which is arranged in axial extension of the bore 40 constituting the locating opening, and the diameter of which is substantially less than the diameter of the bore 40.

When the locating pins 35 of the upper core plate 32 are introduced into the bores 40 of the sleeves 36, the water present in these bores is flushed downwards, below the adaptor plate 30, through the channels 43.

It is thus possible to introduce the locating pins 35 into the sleeves without difficulty, despite the small size of the clearance between the locating pin 35 and the bore 40.

The sleeves 36 have a twofold function. On the one hand, they fix the spring leaves 38 and, on the other hand, they include locating openings of the top nozzle of the assembly, which cooperate with the locating pins 35 of the upper core plate 32.

For each of the assemblies of the core, the top nozzle 26 cooperates with four locating pins 35 of the upper core plate, so that, if a defective pin is cut off, three pins remain, engaged in locating openings of the nozzle 26. This makes it possible to obtain perfect positioning in all cases.

Figure 7:
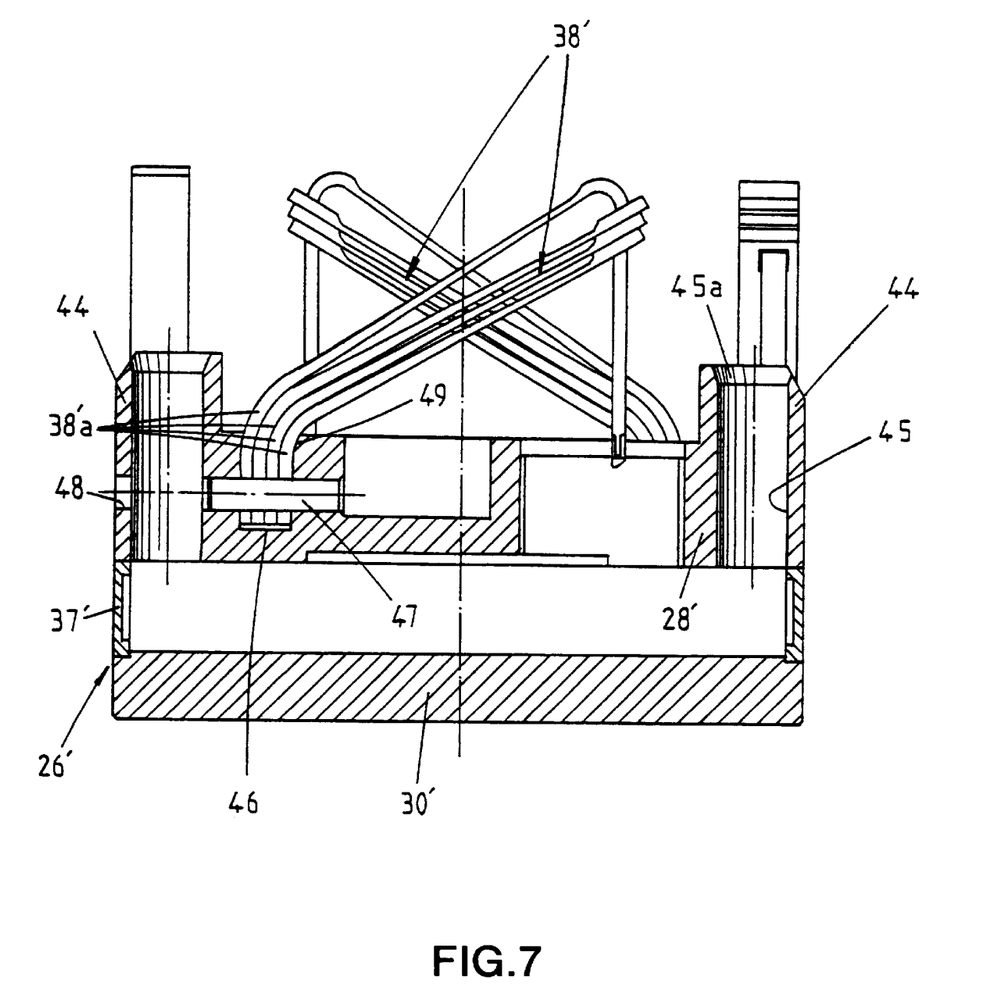
FIG. 7 is a view in section on a vertical plane of a second embodiment of a fuel assembly top nozzle according to the invention.

FIG. 7 represents a fuel assembly top nozzle 26' according a second embodiment of the invention.

The corresponding elements of the nozzle 26' represented in FIG. 7 and of the nozzle 26 represented in FIG. 6 have the same references, but with the sign ' (prime) as regards the elements of the nozzle 26' represented in FIG. 7.

The nozzle 26' includes an adaptor plate 30' which is connected via an enclosure wall 37' to a top plate 28'.

At each of its corners, the top plate 28' has a boss 44 which is preferably integral with the edges of the top plate 28'. Each of the bosses 44 of the top plate 28' is pierced by an opening 45, including a bevelled end part 45a, the openings 45 being identical to the bores 40 in the sleeves 36 of the embodiment represented in FIGS. 6 and 6A.

In order to fix the leaf springs 38' of the nozzle 26', these leaf springs are folded so as to have superposed end parts 38'a by which the springs are fixed inside a cavity 46 machined in the axial direction within the side of the top plate 28'.

The ends 38'a of the spring leaves 38' are pierced so as to receive a fixing pin 47.

The openings 46 ensure clamped mounting of the ends 38'a of the spring leaves, and the spring leaves 38' are fixed on the top plate 28' by introducing the pin 47 into an opening 48 which is machined in the top plate 28' and opens outside the top plate. When the ends 38'a of the spring leaves 38' are introduced into the opening 46, their through-orifices are aligned with the opening 48, so that the pin 47 can be introduced into the opening 48 and into the orifices in the spring leaves 38'. The opening 48 is machined in the top plate 28' so as to pass through the cavity 46 for receiving the ends of the spring leaves.

In order to fix four sets of spring leaves 38' along the four sides of the top plate 28', four openings 46 for receiving the spring leaves and 48 for engagement of a pin are provided, arranged in pairs on either side of two bosses 44 located at the ends of a diagonal of the nozzle.

The emergent part of the opening 46 for receiving the ends 38'a of the spring leaves 38' is machined to have a rounded surface 49 matching a rounded part of the spring leaves, when these spring leaves are bent under the effect of the coolant passing through the fuel assembly in the core of the reactor, and of the expansion of the fuel assembly during transient operation phases of the nuclear reactor.

Despite the differences in shape between the leaves 38 of the embodiment of FIGS. 6 and 6A, and 38' of the embodiment of FIG. 7, the characteristics of these spring leaves are identical as far as holding of the fuel assembly and take-up of the displacements of this assembly during operation of the nuclear reactor are concerned.

In the case of the embodiment represented in FIG. 7, the top nozzle 26' includes four locating openings 45 arranged in the corners of the nozzle and machined inside the bosses 44. These locating openings are intended to cooperate with four locating pins of the upper core plate, which are arranged in the upper core plate zone that bears on the nozzle of the fuel assembly.

The same advantages as in the case of the embodiment represented in FIGS. 6 and 6A are therefore obtained.

It is possible to provide the four locating openings of the top nozzle of the fuel assemblies in bosses which are attached or integral with the top plate of the nozzle, or inside tubular pieces fixed in the corners of the nozzle, by screwing, welding, brazing, crimping or by any other fastening means.

The springs of the nozzle can be fixed by using means other than the means described above.

Finally, the invention applies to any pressurized water nuclear reactor including a core constituted by juxtaposed fuel assemblies held by pins projecting from an upper core plate which rests on the upper parts of the fuel assemblies.

What is claimed is:

1. In a core of a nuclear reactor having upper and lower plates and a core support plate, a fuel assembly comprising a bottom nozzle adapted to rest on said core support plate and a top nozzle perpendicular to an axis of said fuel assembly, said top nozzle comprising:
   (a) a top plate of square shape having a central opening;
   (b) four sleeves having a tubular body and a cylindrical bore, each of said sleeves being placed in a corner of said top plate such that the bore of each sleeve constitutes a locating opening parallel to said axis of said fuel assembly, for receiving a locating pin of an upper core plate of the nuclear reactor; and
   (c) four sets of leaf springs each comprising a plurality of spring leaves stacked on one another and having through openings in an end portion;
   (d) each of said sets of leaf springs being fixed along a side of the top plate through one sleeve engaged in said through openings of said spring leaves in a superposed position; and
   (3) each sleeve fixing only one set of leaf springs.

2. The fuel assembly according to claim 1, wherein each of said sleeves comprises a head projecting laterally to the tubular body of the sleeve and intended to bear on a set of leaf springs, leaves of said leaf springs being interposed and clamped between the head of the sleeve and a part of the top plate, and an end part for fixing said sleeve in said top nozzle.

3. The fuel assembly according to claim 2, wherein said top nozzle further comprises an adaptor plate arranged and fixed parallel to the top plate, and each of said sleeves is fixed through said end part introduced in a through opening of said adaptor plate.

4. The fuel assembly according to claim 3, wherein the end part of each sleeve introduced in a through-opening of the adaptor plate is fixed by means of a bush having a widened part introduced and fixed in a countersunk hole machined in the adaptor plate.

* * * * *